(12) United States Patent
Russell et al.

(10) Patent No.: US 6,556,722 B1
(45) Date of Patent: Apr. 29, 2003

(54) POSITION DETERMINATION

(75) Inventors: Richard Thomas Russell, Orsett (GB); Graham Alexander Thomas, Uckfield (GB)

(73) Assignee: British Broadcasting Corporation, London (GB)

( * ) Notice: Subject to any disclaimer, the term of this patent is extended or adjusted under 35 U.S.C. 154(b) by 0 days.

(21) Appl. No.: 09/449,634

(22) Filed: Nov. 30, 1999

Related U.S. Application Data

(63) Continuation of application No. PCT/GB98/01576, filed on May 29, 1998.

(30) Foreign Application Priority Data

May 30, 1997 (GB) ............................................... 9711316
Jun. 2, 1997 (GB) ............................................... 9711373

(51) Int. Cl.[7] ................................................ G06K 9/36
(52) U.S. Cl. ...................... 382/291; 382/151; 348/94
(58) Field of Search ................................ 382/291, 306, 382/287, 294, 151; 348/94, 95, 87

(56) References Cited

U.S. PATENT DOCUMENTS 4,736,109 A * 4/1988 Dvorzsak .................... 250/566
5,227,985 A 7/1993 Dementhon ................. 702/153
5,768,443 A * 6/1998 Michael et al. ............. 382/294
6,122,410 A * 9/2000 Zheng et al. ............... 382/291

FOREIGN PATENT DOCUMENTS

| EP | 0 265 542 | 5/1988 |
| EP | 0 706 105 | 4/1996 |
| GB | 2005950 | 4/1979 |
| GB | 2218590 | 11/1989 |
| GB | 2259823 | 3/1993 |
| GB | 2267360 | 12/1993 |
| GB | 2284907 | 6/1995 |
| GB | 2 305 050 | 3/1997 |
| WO | PCT/US89/05727 | 12/1989 |
| WO | PCT/DE95/01146 | 8/1995 |
| WO | WO 97/11386 | 3/1997 |

* cited by examiner

Primary Examiner—Yon J. Couso
(74) Attorney, Agent, or Firm—McDermott, Will & Emery

(57) ABSTRACT

In the preferred implementation, the position of an object, for example a studio camera is determined by means of a camera which views several markers disposed about a studio ceiling, the markers being patterened as a series of light and dark rings to encode information in binary form enabling the markers to be identified as the camera moves about the studio. Methods and apparatus of more general applicability are also disclosed.

44 Claims, 6 Drawing Sheets

POSITION DETERMINATION

REFERENCE TO RELATED APPLICATION

This Application is a continuation of International Application No. PCT/GB98/01576, whose international filing date is May 29, 1998, which in turn claims the benefit of GB Application No. 9711316.1, filed May 30, 1997 and GB Application No. 9711373.2, filed Jun. 2, 1997, the disclosures of which Applications are incorporated by reference herein. The benefit of the filing and priority dates of the International and GB Applications is respectfully requested.

The present invention relates to position determination and is particularly, but not exclusively, concerned with derivation of camera position for so-called "virtual studio" television production. In such applications, a virtual scene, for example a computer-generated background, is superimposed onto a real scene, for example actors. It is important to know the exact position and orientation of the television camera in the studio, so that the virtual scene can be computed to correspond to the viewpoint of the real camera, to ensure correct registration between real and virtual elements in the scene.

There are a number of commercially-available systems that can provide camera position information. Most are based on mechanical camera mountings, such as robotic pedestals, pedestals mounted on tracks, or robot arms, which have sensors to measure position and orientation. These systems cannot be used with hand-held cameras, and can be bulky and difficult to use.

There are also methods that work without mechanical sensors, but instead use a patterned blue background, which is visible in the camera image. By analysing the video signal, these methods can deduce the orientation and position of the camera. One example of such a method is described in our earlier GB-A-2271241, which derives pan, tilt and zoom using an arbitrary patterned background. A further example using the same technique is described in WO-A-95/30312, which uses a particular type of pattern to enable pan, tilt, zoom and position to be determined. However, these methods rely on the presence of a two-tone blue background. This is inappropriate in some situations, for example when it is desired to extract shadows of objects from the foreground image. Also, in some situations there may be little or no blue background visible, for example during a close-up shot of an actor. Sometimes it may also be required to place a virtual object against a real background, in which case there will be no blue background at all.

WO-A-9711386 discloses apparatus for determining position and orientation in which a camera is pointed at an optically modulated target.

EP-A-706105 discloses a navigation system for an autonomous mobile robot in which coded signs are placed at various locations. The markers are distinguished based on the ratio of radii of rings.

A method for locating the position of a head-mounted display that has been used in the field of Augmented Reality is described in the paper by Azuma et al entitled "A Demonstrated Optical Tracker with Scalable Work Area for Head-Mounted Display Systems" published in ACM Computer Graphics: Proceedings of the 1992 Symposium on Interactive 3D Graphics (Cambridge, Mass., April 1992), pp. 43–52. This method uses a number of infra-red LEDs mounted in ceiling panels, viewed by four upward-looking sensors mounted on the user's headset. The sensors each provide information of the co-ordinates of bright points in the image (the LEDs) and from these co-ordinates, the known position of the LEDs and the geometry of the sensors, the position of the headset is computed. The inventors contemplated applying Azuma's method to the problem of determination of camera position. However, Azuma's method is not intended to be used for determining the position of a camera in a large studio, but is designed instead to work in a relatively small volume, where the total number of LEDs is small. The inventors identified several potential problems in applying such a technique to the field of camera position determination.

In a television studio, the camera could move many tens of meters, so the method of Azuma et al would require a very large number of ceiling markers of which only a small proportion would be visible at any one time. Azuma's method relies on active control of the LEDs to identify the LEDs. The control electronics and wiring required to implement this in a large studio would be complex and impracticable. Furthermore, the ceiling of a television studio generally contains a number of lights and other objects that could make identifying the markers much more difficult than in the carefully controlled conditions in which Azuma's method is designed to function; the bright spot sensors used by Azuma would generate spurious signals. A still further problem the inventors have identified is that the set of markers that the camera can see will change, not only due to markers coming into and out of the field of view as the camera moves, but also due to markers being obscured by objects such as microphone booms and studio lights. Using Azuma's method, each time a marker appears or disappears, there is likely to be a small but sudden change in the computed position and orientation of the camera, since any errors in the camera calibration or the measurement of the marker positions will lead to results that depend on which markers are being used.

Thus, Azuma's method cannot be directly applied to the present problem. The inventors have developed novel techniques which are particularly suited to the exacting requirements of determining camera position in a television studio, which overcome or alleviate the drawbacks of conventional techniques. References in this specification to a video camera are intended to include any camera capable of obtaining video images; although the video camera is advantageously a conventional television studio camera, no limitation to a particular type of camera or intended use is implied.

In a first aspect, the present invention provides a method of determining the position of an object comprising:

providing a plurality of markers at respective reference positions, at least some of the markers being patterned to encode identification information, the pattern providing a reference point for each marker;

storing information including a measure of the positions of the markers and information identifying the patterned markers;

obtaining an image of at least a sub-set of said plurality of markers from a camera associated with the object;

processing the image to identify the positions of said markers in the image and, for each patterned marker in the image, decoding said identification information;

determining a measure of the position of the object based on said processing and decoding and based on said stored information.

Thus, with the invention, at least some, and preferably all, markers are patterned to encode information identifying the marker. In this way, it becomes possible to determine not only relative movements of the object but also the absolute position by "looking up" the positions of each patterned marker. This may enable much greater freedom of movement of the object over a wider area whilst allowing absolute position to be measured accurately. In addition, determination of relative movement may be simplified or improved.

Preferably, the pattern comprises concentric shapes, preferably substantially closed rings; the use of concentric rings to encode the information facilitates location of the markers, as the centre of the rings can conveniently be located and provides a convenient reference position. Preferably, identifying the positions of the markers includes identifying the centres of the concentric rings as a reference point for each patterned marker. Although the rings are most preferably concentric to within the resolution of the camera means in use as this greatly facilitates identification and decoding, they need not be exactly concentric; in such a case, eccentricity may be used to provide a measure of angular orientation, and the reference point may be determined based on, for example, the centre of the innermost ring.

Preferably, the patterned markers encode information as a series of light and dark regions. This enables a monochrome camera to be used to identify the markers, allowing higher resolution to be obtained at 756° lowest. The camera may operate in the visible region of the spectrum, the patterned markers having visible-markings; this facilitates identification of the markers during setting up by a user. However, infra-red (or ultra-violet) light may be used.

Preferably the identification information is encoded in binary form as the brightness or reflectivity of each ring. This can provide a robust and simple coding scheme. The rings in such a scheme are preferably of known inner and outer diameter and preferably of substantially equal thickness. If the dimensions or relative dimensions of each ring are known, it is not necessary for the rings to be visibly delimited; adjacent rings can be contiguous even if of the same shade. In addition, a measure of the distance to each marker can be derived based on the size of the marker in the image.

Alternatively, the information can be encoded in binary form as the thickness of each ring, successive rings preferably alternating between light and dark.

The rings are preferably substantially circular (this facilitates detection and decoding) and preferably all of the same or similar shapes. However, other shapes (for example squares, rectangles or polygons) may be used; the term "ring" as used in this specification is intended to encompass such non-circular rings.

Surprisingly it has been found that good results can be obtained with monochrome patterns and binary encoding, even though this may require several rings. This has been found to be due in part to the better resolution and linearity generally attainable with monochrome cameras than with colour cameras. In addition, monochrome encoding enables a much higher dynamic range between light and dark to be attained and provides lower sensitivity to changes in ambient lighting.

Indeed, this binary encoding enabling monochrome detection is an important feature which may be provided independently in a second aspect, in which the invention provides a method of determining the position of an object comprising:

providing a plurality of markers at respective reference positions, at least some of the markers being patterned to encode identification information in binary form as a series of light and dark regions, the marker also providing a detectable reference point;

storing information including a measure of the positions of the markers and information identifying the patterned markers;

obtaining an image of at least a sub-set of said plurality of markers from a camera, preferably monochrome camera means, associated with the object;

processing the image to identify the positions of said markers in the image and, for each patterned marker in the image, decoding said identification information;

determining a measure of the position of the object based on said processing and decoding and based on said stored information.

Surprisingly, if binary encoding is used, the markers can be relatively complex and still be reliably decoded. Thus, in preferred arrangements, the markers encode at least 3, and more preferably 4 or more bits of identification information. This facilitates identification of the markers, as a larger number of markers can be uniquely identified. Preferably, at least one guard ring or error-correcting ring is provided, so the markers contain at least 4 or more rings.

In a related third aspect, the invention provides a set of patterned markers each comprising a series of concentric rings, each marker encoding a plurality of bits of information in binary form as the brightness or reflectivity and/or thickness of each ring, the information encoded varying between the markers. Some markers may be repeated (i.e. encode the same information) within the set.

The invention also provides use of a series of concentric rings to encode a plurality of bits of information in binary form as the brightness or reflectivity and/or thickness of each ring.

The invention further provides, in a fourth aspect, a method of producing a marker encoding a plurality of bits of information, the method comprising obtaining the information to be encoded in binary form and providing on a backing a series of concentric rings, each ring having either a high or a low brightness or reflectivity, the thickness and brightness or reflectivity of each ring being selected according to a pre-determined coding scheme to encode the information.

This may be implemented as a method of producing a marker encoding a plurality of bits of information, the method comprising obtaining the information to be encoded in binary form and providing on a backing a series of concentric rings, each ring corresponding to a bit of information to be encoded and having a first brightness or reflectivity to encode a binary "0" and a second brightness or reflectivity to encode a binary "1".

A variety of coding schemes may be used, including self-clocking and self error-correcting schemes. For example, known linear barcoding schemes may be used with successive bars corresponding to successive rings.

Although a number of coding schemes may be used, it is found that, surprisingly, a simple coding scheme in which the rings are of substantially constant thickness and each have a brightness or reflectivity corresponding directly to a bit of information can provide a compact marker which can be reliably and readily decoded.

One or more parity bits or error-correcting bits may be included (preferably one parity bit for the "even" rings and one for the "odd" rings); this enables offset errors to be detected.

Decoding the markers may include comparing the identification information to predicted identification information based on marker positions and correcting or verifying the identification information based on the results of the comparison. For example, if the decoded marker identification information differs from the predicted information by an amount corresponding to a single bit or a shift of all bits, this may be interpreted as a corresponding read error and corrected "intelligently".

The backing preferably has a surface coating of said first or second reflectivity or brightness (for example white or retro-reflective or black); in this way, only rings of the other reflectivity or brightness need be actively provided, for example by applying retro-reflective material or pigment.

The dark regions are preferably substantially black. The light regions may be white, but may be advantageously formed by retro-reflective material, to be illuminated by a light substantially optically coincident with the camera axis. This enables a high level of contrast to be attained, and facilitates detection of markers. The use of retro-reflective material and a light source associated with the camera renders detection of the markers less sensitive to changes in ambient lighting conditions, as may occur in a television studio. In place of retro-reflective material, fluorescent pigments may be employed to enhance the contrast.

Preferably each patterned marker has an outer region, preferably a relatively wide annular region, which is substantially the same shade for each marker, preferably dark; this may facilitate distinguishing the marker from other items, for example studio lights. Preferably the ring immediately inside the outer region is of the opposite shade to said outer region, preferably light; this may facilitate determination of the size of the pattern and enable more reliable decoding of the information. The outer region may contain one or more markings enabling the angular orientation of the marker to be determined.

The innermost ring or rings may be of predetermined brightness to facilitate detection of the centre of the marker, or may be used to encode identification information.

As an alternative to binary encoding, the rings may vary in colour, each ring encoding more than one bit of information. For example, a range of colours may be employed, with a particular bit pattern assigned to a selected colour, preferably based on an RGB encoding scheme. This may allow more information to be encoded in a smaller number of circles (for examples, if 8 secondary colours are used, each ring can encode 3 bits).

Preferably, at least some markers encode identification information uniquely identifying that marker among the plurality of markers. This enables the absolute position to be determined without needing to know an initial starting position. The markers are preferably so disposed that the position of the object can be uniquely determined at all points within a given volume.

The method may include adjusting the determined position to smooth out sudden changes in determined position as markers are revealed or obscured. This may alleviate the problem of small, but nonetheless sudden and very visible changes in determined object position due to small errors in determination of position of the markers as different markers move in and out of the field of view of the camera. Adjusting is preferably achieved by applying correction factors to the stored or measured positions of the markers so that determination of object position is based on corrected marker positions, the correction factors being calculated so that the corrected marker positions tend to mutually self-consistent values, the rate of variation of the correction factors being kept below a pre-determined level.

Adjustment may be effected by tracking movement of the markers as the object position changes and generating 3-dimensional correction vectors. In this way, stable, refined marker positions may be determined. However, tracking markers over several frames may be computationally intensive, and will fail to produce stable values for marker positions where errors are attributable to any non-linearity in the camera or lens. Thus, a preferred, simpler implementation of adjustment comprises generating correction factors with 2 degrees of freedom (for example displacement vectors parallel to the image plane or parallel to the reference surface) and correcting the marker positions to tend to render the marker positions self-consistent for an image frame or for a series of image frames.

The rate of variation may be limited so that adjustment of the correction factors occurs over a period of a few seconds (preferably at least about 2 seconds, preferably less than about 15 seconds, typically about 5–10 seconds), so that a gradual drift in the determined position occurs which is much less perceptible than a sudden shift.

A measure of the error or accuracy of position determination may be provided based on the self-consistency of determined position calculated for each marker. This may be based on the magnitude of said correction factors.

In a fifth aspect, the invention provides a method of determining the position of an object based on identification of a plurality of markers at respective reference positions, the method comprising applying correction factors to stored measures of the marker positions to produce respective corrected marker positions and determining the object position based on the corrected marker positions, wherein the correction factors are calculated so that the corrected marker positions tend to mutually self-consistent values, the rate of variation of the correction factors being limited to a predetermined level.

Although the markers may be adhered to a flat reference surface, the markers are preferably positioned at varying distances from a reference surface, preferably the ceiling of a room in which the object is moved; this is found to provide a surprising improvement in the accuracy of detection of movement of the object. Particularly in such a case, the stored information preferably contains a measure of the distance of each marker from the reference surface. This may be achieved by storing the three-dimensional co-ordinates of each marker with respect to a defined origin (in cartesian or any polar or curvilinear form which is convenient for the position determination algorithm).

In the preferred application, the object is a video camera, and the camera means comprises a separate, generally upward pointing, camera mounted on the video camera.

In a sixth, apparatus, aspect, the invention provides apparatus for position determination comprising a camera for mounting on an object whose position is to be determined; memory means arranged to store measures of the positions of a plurality of markers and to store information identifying patterned encoded markers; image processing means arranged to process an image output by the camera to identify the positions of markers in the image; decoding means for decoding information encoded in the patterned markers; and position determining means arranged to determine the position of the object based on the output of the image processing means, the decoding means and the information stored in the memory means.

The memory means, image processing means and position determining means may all be integrated into a single computer. However, preferably, at least part of the function of the image processing means is provided by a hardware accelerator arranged to identify one or more markers or to decode one or more patterned markers or both.

The apparatus preferably further includes means for applying correction factors to stored measures of the marker positions to produce respective corrected marker positions and determining the object position based on the corrected marker positions, wherein the correction factors are calculated so that the corrected marker positions tend to mutually self-consistent values, the rate of variation of the correction factors being limited to a pre-determined level.

In cases where the position of a video camera (separate from said camera means) is determined, position determination may be supplemented by information obtained from the video camera image. In addition, information concerning the video camera zoom and focus settings may be input. One or more encoded markers may be placed in the field of view of the video camera. Provision of encoded markers at specific positions in the field of view is much easier to implement in practice than provision of a patterned background for an entire studio, as used in prior art methods. Moreover, the encoded markers may enable more accurate measurement than a conventional background in which it is difficult to provide accurate patterning over a large area.

Thus, the method of the first or second aspect may further comprise providing at least one supplementary marker at a given position so as to be viewable by the video camera, the or each marker having identification information encoded thereon in binary form as a series of concentric rings of two tones, the tones being selected to enable the marker to be keyed out of the video camera image by chroma-keying, said determining the position of the video camera being based on the position of the supplementary marker, if present, in the video camera image.

This supplementary positioning may be provided independently, as a seventh aspect, in a method of determining or correcting a measure of the position of a video camera, the method comprising providing at least one marker at a given position viewable by the camera, the or each marker having identification information encoded thereon in binary form as a series of concentric rings of two tones, the tones being selected to enable the marker to be keyed out of the video camera image by chroma-keying, a measure of the position of the video camera being determined based on the position of the marker, if present, in the video camera image. Complete position determination may be effected by use of several such markers so that preferably at least three individual markers are always visible, or by additionally using mechanical sensing, or other optical methods, with the encoded markers providing a check or reference point. Preferably a set of preferably at least three individual markers are mounted on a substantially rigid support to form a cluster of markers, the markers preferably being non co-planar.

In an eighth aspect, the invention provides marker apparatus for positioning in the field of view of a camera for use in determining the relative position of the camera and the marker apparatus, the apparatus comprising at least three non-co-planar patterned markers mounted at predetermined relative positions on a substantially rigid base, the patterned markers each having identification information encoded thereon in binary form. The information is preferably encoded as a series of concentric rings, preferably of two tones, the tones being selected to enable the marker to be keyed out of the video camera image by chroma-keying.

Reference has been made above to a camera means mounted on the object and markers disposed around a volume in which the object is located. This is indeed preferable for determining the position of a camera in a large studio. However, it will be appreciated that the technique may be employed to determine the position of one or more objects on which markers are located using one or more cameras mounted in the volume in which the object is located. For example, the positions of several cameras within a relatively small studio may be determined by a single camera mounted in the ceiling of the studio and having a sufficient field of view to view all cameras; this may lead to a saving in cost.

Thus, in a ninth and final aspect, the invention provides a method of determining the relative positions of camera means and an object having a plurality of markers, preferably at least three, mounted thereon, the relative positions of the markers and the object preferably being substantially fixed, each marker being patterned to encode identification information in binary form, preferably as series of concentric rings, the method comprising storing the relative positions of the markers and information enabling the identification information to be decoded, identifying the positions of the markers and decoding the identification information thereon, and, based on the stored information, determining a measure of the relative positions and orientations of the camera means and the object. The method is preferably employed to determine the positions of several objects relative to the camera means, the objects being distinguished based on the identification information. The camera means may comprise several cameras having different viewpoints.

An embodiment of the invention will now be described in more detail, with reference to the accompanying figures in which.

Figure 1:
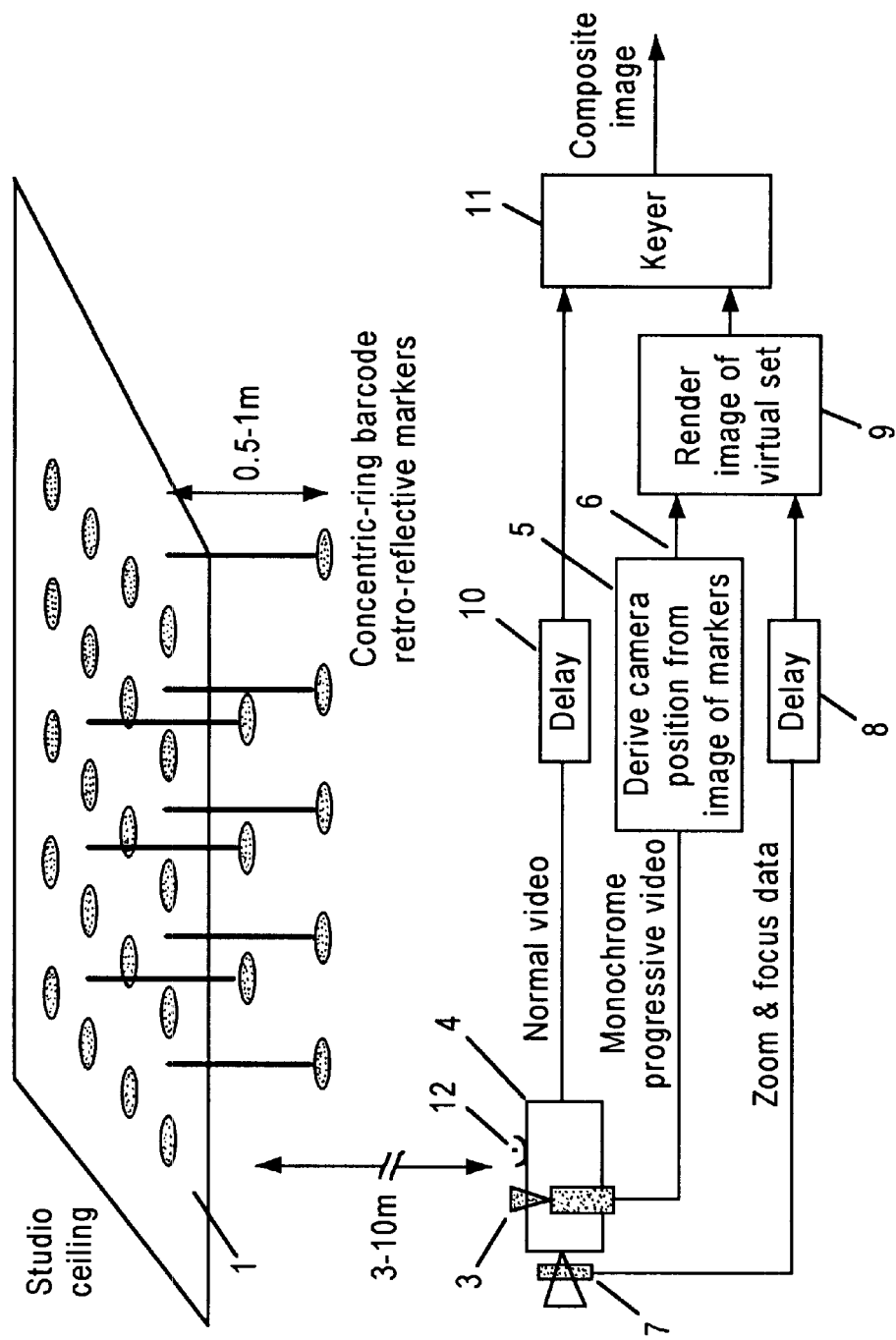
FIG. 1 shows the arrangement in a studio.

The way in which a camera position system according to the present invention may be applied in a virtual studio is shown in FIG. 1. A number of markers 1 are fixed on the studio ceiling. Further markers are fixed a short distance below the ceiling, mounted on rigid poles 2. Although the system can work with markers in a plane, greater accuracy may be achieved with markers arranged at different heights, as shown. The system can alternatively be implemented with markers placed in positions other than on the ceiling (such as on a wall, or even on the floor), although mounting them on the ceiling is likely to be most practical in many situations.

The markers are viewed by an upward-looking camera 3 mounted on the side of the normal studio camera 4. The upward-looking camera, referred to as the auxiliary camera, is preferably a monochrome camera, and is preferably progressively-scanned. The markers may be illuminated by a light 12. The signal from the camera is analysed by an analyser 5 to compute the camera position and orientation of the auxiliary camera. The analyser then computes the position and orientation 6 of the studio camera, by compensating for the relative orientation and position of the auxiliary camera 3 and the studio camera 4.

The analyser can be implemented using either special-purpose hardware, or by a combination of a frame grabber and a general-purpose computer. Information on the settings of zoom and focus of the studio camera may be gathered using conventional sensors 7, and delayed by a delay 8 to compensate for the delay in the processing 5. The renderer 9 computes the view of the virtual world according to the measured position, orientation and zoom values. Such renderers are available commercially, and are usually based on graphics computers. The normal video signal from the camera is delayed by delay 10 to compensate for the delays in the camera position calculation and the image rendering, before being combined with the rendered image using the conventional keyer 11.

Figure 2:
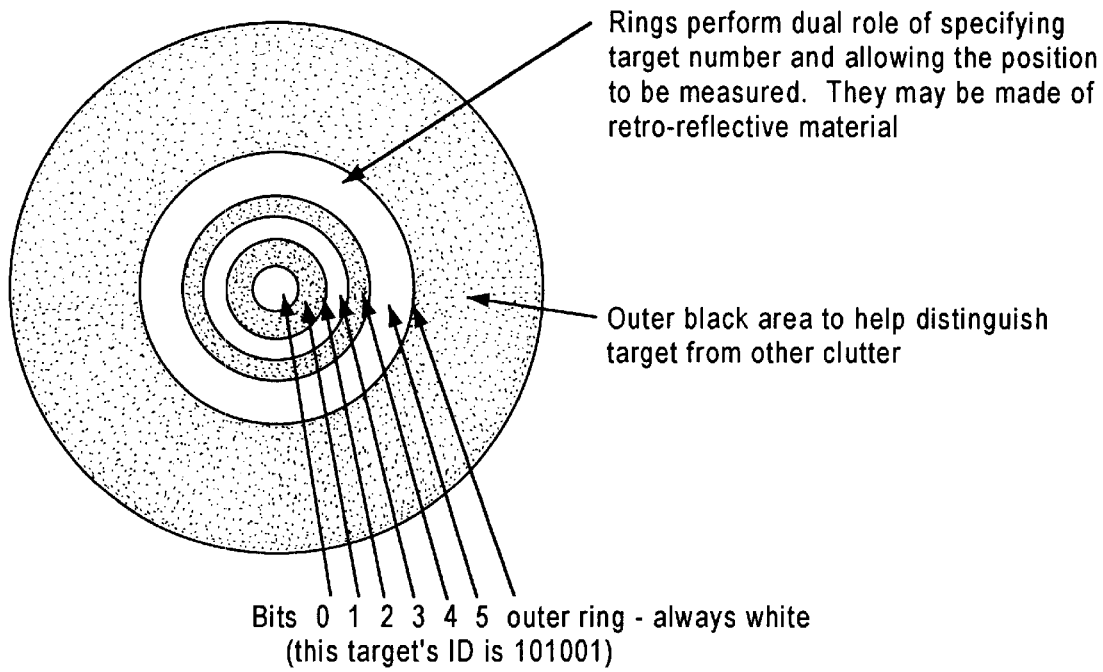
FIG. 2 shows an example of a marker.

An example of a marker according to the present invention is shown in FIG. 2. The marker shown has bright concentric rings against a dark background. The bright parts are preferably made using retro-reflective material, illuminated by a light adjacent to the camera viewing the markers as shown in FIG. 1. A suitable form of retro-reflective material is 'Reflective silver adhesive transfer film', part no. 8850, made by 3M. In the example shown in FIG. 2, the marker is divided into a number of concentric rings of equal width. The outer ring is always white, and serves to delimit the edge of the marker. Each inner ring is either bright or dark, to indicate a '1' or '0' in the corresponding bit of the marker number. Other types of barcode, for example based on the spacing between transitions rather than the brightness of particular bands, are also possible. The example in FIG. 2 has 6 inner rings, giving a 6-bit code that can represent numbers in the range 0–63. It is preferable not to use all possible code numbers, thereby allowing some redundancy. For example, one bit could be used as a parity bit, so that an error in reading one bit can be detected. It is also preferable not to use the code whose representation is a solid white circle (63 in this case), since other objects, such as a studio light against a black background, could be incorrectly interpreted as a marker.

Positioning of the markers for a typical application will now be described. For studios with floor areas up to about 50 square meters, a 9-bit barcode is sufficient to uniquely identify every marker required. For larger studios, some marker numbers can be re-used, and the system can deduce which marker is which by reference, for example, to the nearest uniquely-numbered marker. The minimum size of the markers must be chosen to ensure that the barcode can be successfully read by the auxiliary camera. The present barcode design and reading algorithm preferably requires a minimum spacing between rings corresponding to about 1.5 pixels on the camera sensor to allow reliable reading. For example, if the markers were about 4 m above the auxiliary camera, each contained a 9-bit barcode, and a conventional-resolution camera with a minimum field of view of 30 degrees was used, the minimum marker diameter is approximately 12 cm. The markers should be positioned so that the auxiliary camera can view a minimum of three, and ideally 10 or more, at any one time. Allowance must be made for some markers being obscured by lights, microphone booms, and so on. For example, in a situation with markers at heights of 4 m and 4.5 m, a maximum working height of the camera of 2 m and the minimum field of view of the auxiliary camera of 30 degrees, positioning markers in a square lattice at 0.4 m intervals would ensure that at least 12 were potentially visible, which should allow good performance even if half of these were obscured by obstacles such as lights. Although the markers can be positioned in a coplanar manner, the accuracy of the computed camera position is significantly improved if the markers are placed at differing distances from the camera. For example, some markers could be mounted directly on the ceiling of a studio, with others mounted on girders or poles hanging a little way below. The position of each marker should ideally be known to an accuracy of approximately 1 mm in order to meet the overall accuracy requirements. This could be achieved by measuring the position of the markers using a theodolite, although this would be time-consuming. An alternative method has been developed. First, the positions of the markers are measured roughly, to an accuracy of a few cm. A number of images of the markers are then analyzed to yield accurate positions.

Figures 3, 4:
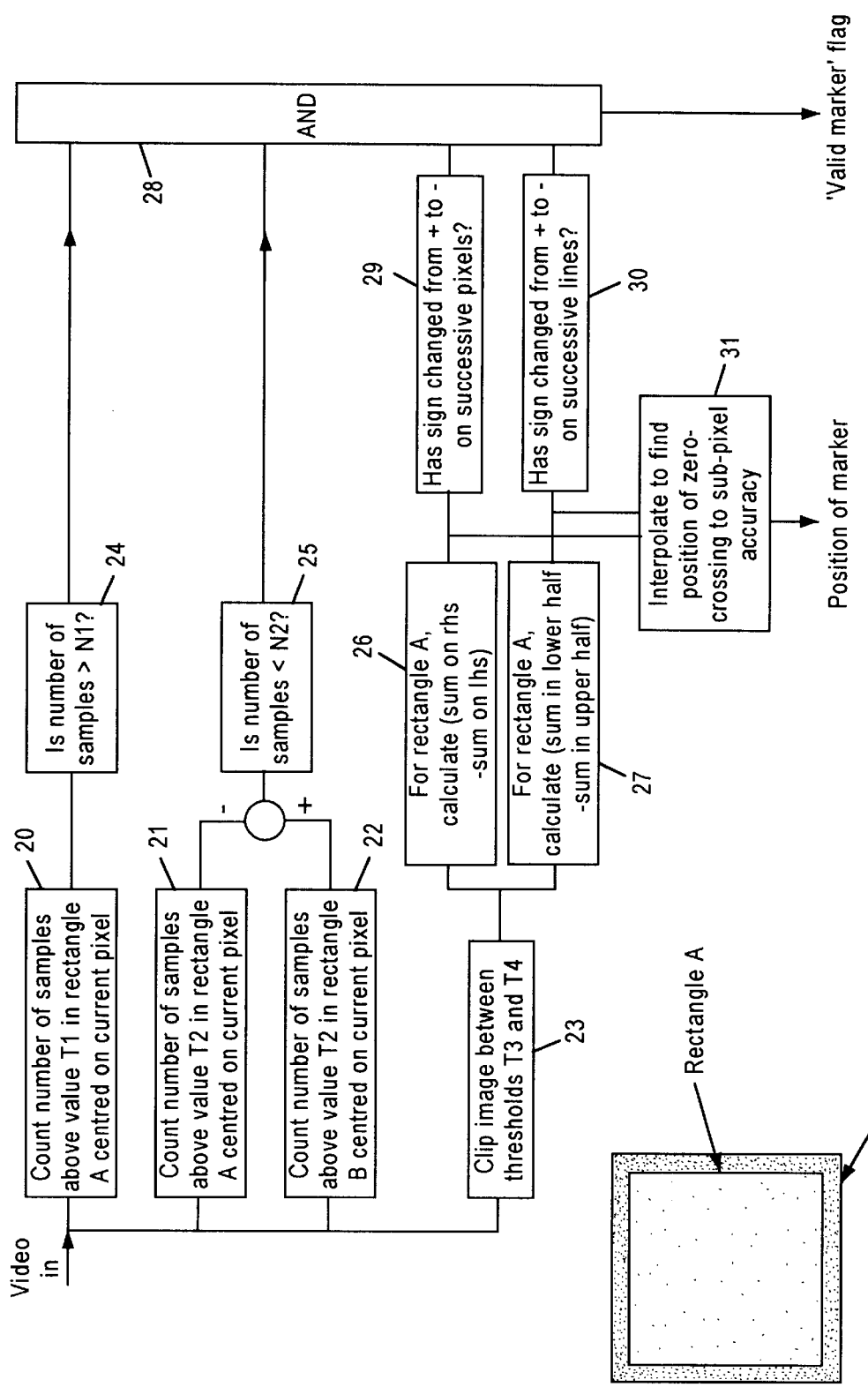
FIG. 3 shows a block diagram of an algorithm that may be used to locate markers in the image.
FIG. 4 shows the aperture of the filters used in the marker detection system.

The first task that analyser 5 in FIG. 1 carries out is to identify possible markers in the image. The marker design shown in FIG. 2 allows this to be achieved with a simple algorithm that requires relatively little computation. A block diagram of such an algorithm is shown in FIG. 3. It is based on the use of filters with rectangular apertures, which can be implemented using one-dimensional horizontal and vertical filters. Note that for clarity, FIG. 3 does not show any additional delays to compensate for the differences in processing delay of the various elements. An example of the apertures used is shown in FIG. 4. The inner rectangle A is chosen to be large enough to completely cover all rings of the marker, for the largest expected size of a marker in the image. The outer rectangle B is chosen to fit within the black outer surround of the marker, for the smallest expected size of a marker in the image.

Figure 5:
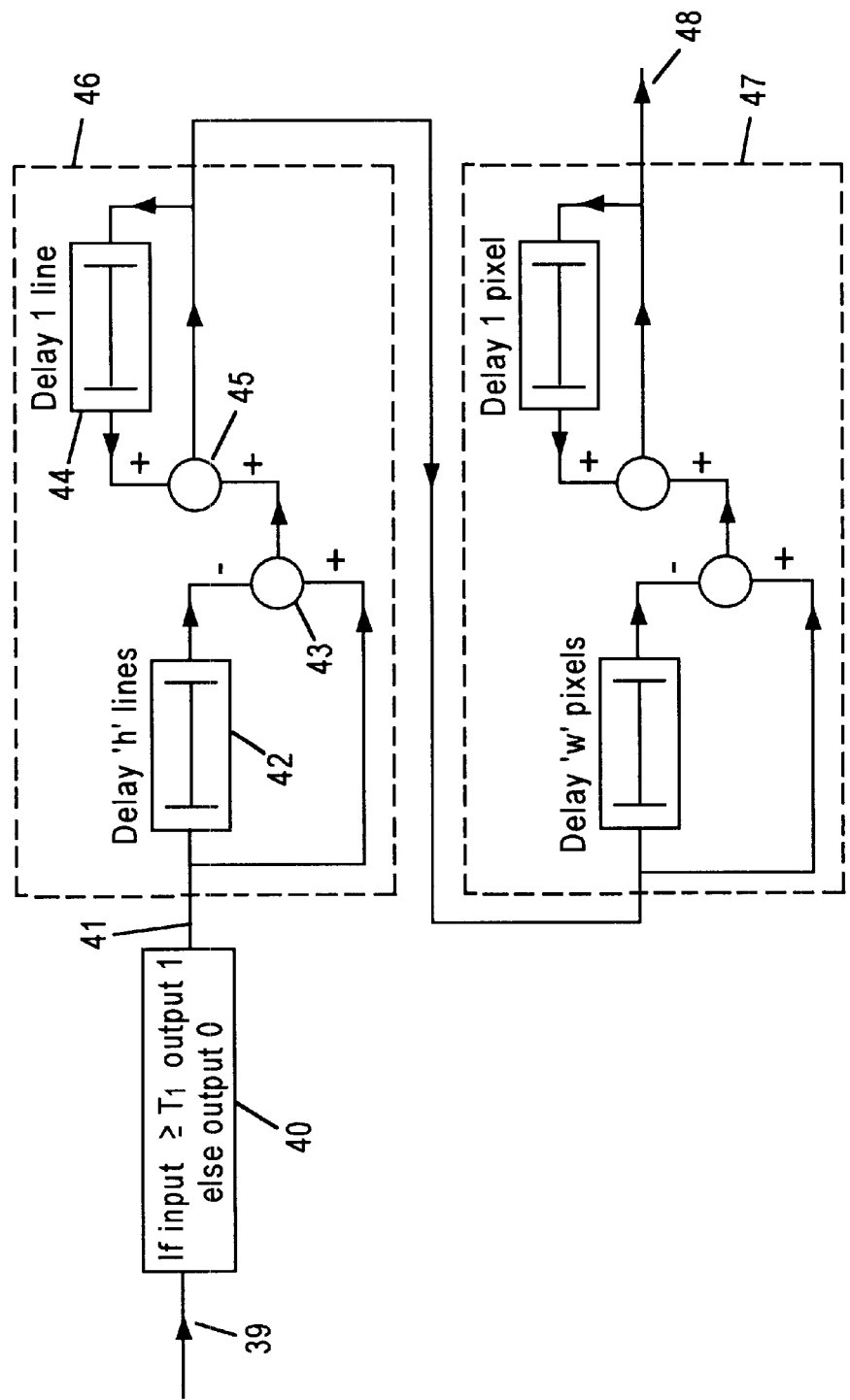
FIG. 5 shows in detail the process of counting the number of samples above a given threshold in a rectangular area of the image.

The operation of the marker detector shown in FIG. 3 will now be described in detail. The video signal from the upward-looking camera is input to a sample counter 20 which counts the number of samples above a threshold T1 in a rectangle A centred on the current pixel. This threshold is chosen to correspond to a brightness level between the values of black and white as they appear on the target. This can be implemented using the circuitry shown in FIG. 5, which will now be described. A comparator 40 compares the input signal 39 with a threshold T, and produces a signal 41 which is unity for samples whose values are greater than or equal to T, and zero for samples less than T. This signal is fed to a vertical summer 46, which computes the sum of its input samples over a vertical aperture of height 'h'. This signal is then passed to a horizontal summer 47, which performs a similar operation for a horizontal aperture of width 'w'. Summers such as these are used in many image processing operations, but for completeness their operation will be described. The following description relates to the vertical summer, the horizontal summer operates in a similar manner. The delay 42 delays the signal by the number of lines equal to the height of the rectangle A. The subtractor 43 forms the difference between the input and output of the delay. The line delay 44 and adder 45 form an integrator which accumulates the output of the subtracter 43. As samples enter the region of height h lines, they are therefore accumulated in the integrator, and as they leave the region, they are subtracted from the accumulated value. The output of adder 45 is thus equal to the number of samples above threshold T in a column of pixels of height h lines. Similarly, the output of the horizontal summer 48 is equal to the number of samples whose values are equal to or greater than the threshold T over a rectangular area of h lines by w pixels.

The output of the sample counter 20 in FIG. 3 is fed to a comparator 24. The comparator produces a 'true' output whenever there are more than N1 samples in rectangle A over threshold T1. The values of T1 and N1 are chosen so that this condition is satisfied whenever a marker lies within the rectangle A. Further similar processing is used to check whether the marker is surrounded by a black border. Sample counter 21 counts the number of samples above a threshold T2 in rectangle A. T2 is lower than T1, and is chosen to be just above the nominal brightness of the black background. Sample counter 22 performs the same task for rectangle B. The difference between the two values corresponds to the number of samples above the threshold T2 in the region between rectangles A and B in FIG. 4. The comparator 25 tests for this number being less than N2, which should be a small number compared to the number of pixels in this region. Its output is 'true' whenever this condition is satisfied.

The possible presence of a marker is indicated when the outputs of comparators 24 and 25 are both 'true'. However, this will probably occur for many adjacent sample positions, centred around the actual marker centre. To identify the exact position of the marker centre, some further processing is carried out. The image signal is first clipped between two levels T3 and T4 by the clipper 23. That is, if the input to the clipper is between T3 and T4, the output is equal to the input. If the input is less than T3, the output is T3, and if the input is greater than T4, the output is T4. The levels T3 and T4 are chosen to ensure that the black surround of the markers lie below T3 and the white level of the rings lies above T4. This prevents any slight changes in illumination level across the marker from disturbing the measurement of the centre position. The clipped signal is then processed to estimate the position of the centre of the marker. The processing is carried out separately for the horizontal and vertical position. To estimate the horizontal position, the values of the clipped image signal are summed independently in the left and right-hand halves of rectangle A. This may be carried out with an arrangement similar to that shown in FIG. 5, without the initial comparator 40. The sum of the values in the right-hand half is subtracted from those on the left. This is carried out by process 26 in FIG. 3. This value will be positive when the marker appears predominantly in the right-hand half, and conversely will be negative when it lies predominantly in the left. This signal is examined for its sign changing from positive to negative on successive pixels by the sign-change detector 29, indicating that the position of rectangle A has moved from being just to the left to just to the right of the centre of the marker. This detector produces a 'true' output when this occurs. The horizontal position of the marker centre is estimated to sub-pixel accuracy by interpolator 31 which estimates the position at which the output of 26 passed through zero. This can be achieved, for example, by linear interpolation between the two values either side of zero. Similar processing (27, 30) is used to locate the vertical position of the marker centre.

This method of finding the centre of a marker has the advantage of being computationally efficient, since the majority of the processing requires only a small number of adders, subtractors and delay elements. However, more sophisticated methods of finding the centre of the image of a circle may also be used. Many possible methods are known from the literature, based for example on computing the centre of gravity, or tracing the edge contour. Such methods could be applied to this invention, and may offer the possibility of obtaining greater accuracy at the expense of higher computational requirements.

The presence of a marker is flagged whenever the outputs of 24, 25, 29 and 30 are all 'true'. When this happens, the position of the marker, interpolated to sub-pixel accuracy, may be read from interpolator 31.

Once the centre of a marker has been found, the image around this position may be processed to read the marker number represented by the barcode. The algorithm used for performing this will depend on the type of barcode used. For example, with the type of barcode shown in FIG. 2, one way to proceed is as follows. A number of consecutive video samples are selected, starting at the pixel nearest the marker centre and extending to the edge of rectangle A. These pixels will represent samples along a radius of the marker. The outer edge of the marker is located by examining the samples, starting from the outermost one and working inwards, looking for a sample above a given threshold. The threshold would normally be chosen to be mid-way between the video levels of white and black. Once the edge is located, the positions along the radius corresponding to the centres of each bit of the barcode may be examined, and compared to the threshold. This process may make use of interpolation to estimate the video levels at locations between existing samples. For each bit position, the bit in the code is set to 1 if the video level is above the threshold, else it is set to zero. This process may be repeated for several sets of samples starting at the centre, for example working to the left, the right, above, and below the centre. This allows a number of independent readings of the barcode to be made. The readings may be compared, and the marker either accepted or rejected. For example, a marker could be accepted as valid if three out of four readings of the barcode agree, or alternatively a unanimous verdict may be required. Further modifications are possible, for example changing the thresholds used in the barcode-reading process to obtain the best possible agreement between readings along different radii.

If the barcode-reading process produces an acceptable result, a database listing all markers in the studio is examined to check that the marker exists, and if so to determine its coordinates in the studio. If the marker is not in the table, it may be discarded as corresponding to an erroneous reading. Alternatively, some error-correction techniques could be employed to attempt to correct for mis-read bits in the barcode. There are several well-known error correction methods that can be employed, at the expense of incorporating redundancy in the barcode. This requires the addition of more bits to the code, requiring larger markers. Other information could be used to help resolve an unsuccessfully-read barcode, such as an estimate of which marker might be expected at this position in the image, given knowledge of the camera position measured on the previous frame.

From the list of marker positions in the image and the corresponding positions of the markers in the studio, it is possible to compute the camera position and orientation. For example, this may be carried out using the standard photogrammetric technique of 'bundles adjustment', which computes the camera position and orientation that minimise the sum of the squares of the distances between the positions in the image at which the markers would be expected to appear (given the known position of the markers in the studio and the internal camera parameters) and where they are actually found. Suitable techniques for performing bundles adjustment are described in "Manual of Photogrammetry, 4th Edition" American Society of Photogrammetry, Falls Church, Va., 1980, edited by Slama, C. C. More sophisticated methods may alternatively be used that do not require complete knowledge of the internal camera parameters or marker positions.

Figure 6:
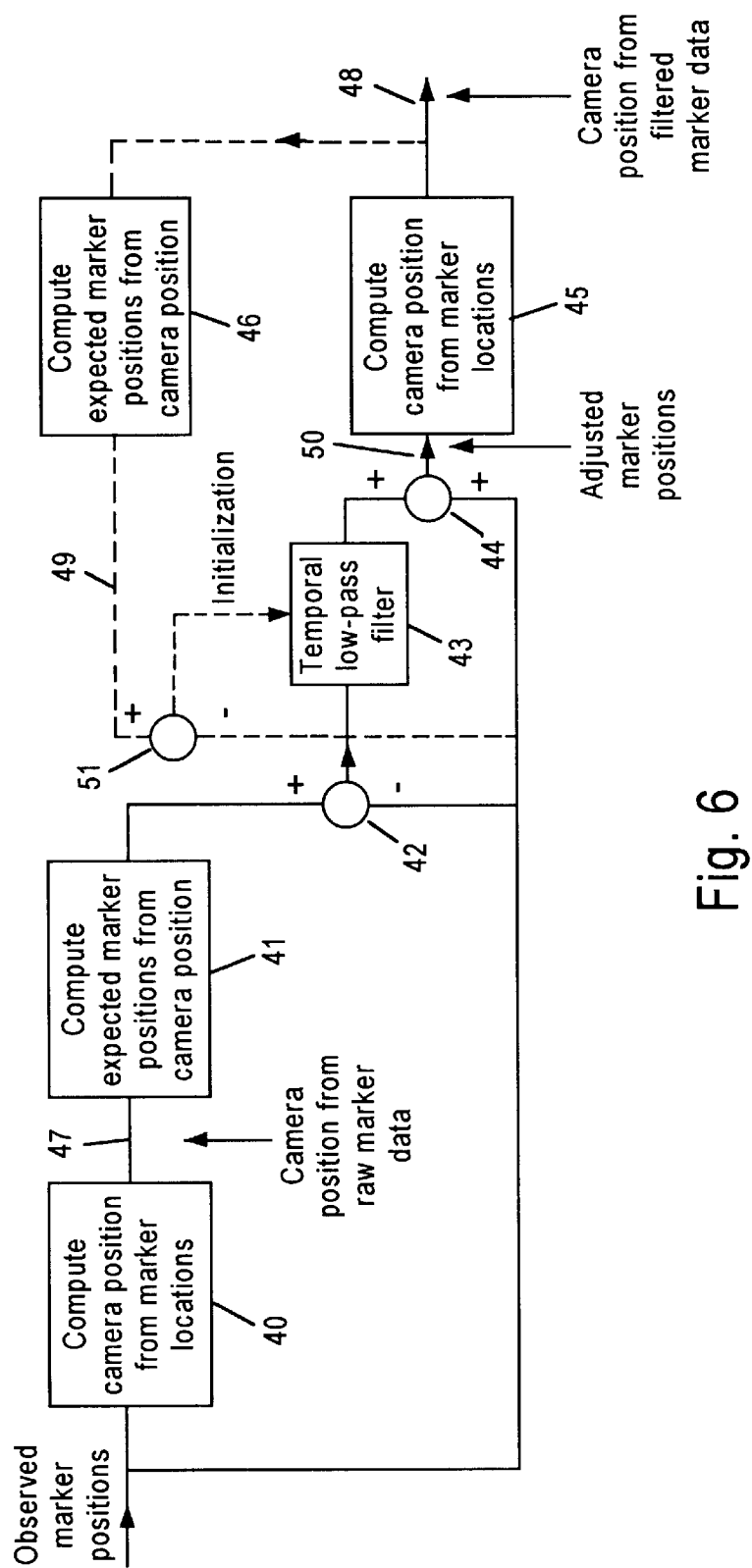
FIG. 6 shows the method used to prevent the appearance or disappearance of markers from causing a sudden change to the computed camera position.

However, performing this computation using the marker positions exactly as found in each image can result in a sudden change in the computed camera position as different markers come into and out of view, as explained earlier. It has been found to be much more acceptable for the computed camera position to change slowly in such circumstances. This is particularly helpful in a situation where a marker is intermittently detected, since the effect of it disappearing for one frame and then reappearing can be significantly reduced. The way in which this is achieved is shown in FIG. 6, which will be explained in more detail below.

The positions and barcode numbers of the markers found in the image are first passed to a process 40, which computes the camera position based on this information using standard photogrammetric techniques. The position and orientation computed, 47, will be liable to change suddenly if a marker disappears or reappears, as explained earlier. The position and orientation are input to a process 41 which computes the positions in the image at which the markers would be expected to have appeared, based on the measured camera position, the internal parameters of the camera, and the positions of the markers in the studio. The difference between the expected and actual marker positions is computed by a subtracter 42. Two subtraction operations are required for each visible marker, one for the horizontal coordinate and one for the vertical coordinate. If the camera calibration and absolute marker locations are perfectly accurate, the output of this subtracter will be zero for each marker; however in a practical situation there will be small differences. Note that the process 40 typically aims to minimise the sum of the squares of these differences. In some implementations of 40, the differences will be generated during the computation process, so that a separate process 41 may not be required. These difference signals (comprising horizontal and vertical displacement differences for each marker) are filtered by a temporal low-pass filter 43. This filter may be, for example, a first-order recursive filter. The filter may be applied separately to the horizontal and vertical position differences for each marker, although more sophisticated processing that treats both components together is also possible. The filtered position differences are added to the observed marker positions by an adder 44 to form a set of 'adjusted' marker positions 50. The position and orientation are computed from these adjusted positions by a process 45, which operates in essentially the same way as process 40. Note that in some implementations of the processes 40 and 45, it is useful to have an estimate of the camera position, for example to initialise a recursive minimisation process. If this is the case, it may be convenient to use the camera position computed by 40 to initialise the process 45. The position computed by 45 may be used to initialise the process 40 on the next frame.

In a steady state with no camera movement and no markers appearing or disappearing, the output of the low-pass filter 43 will be the same as its input, so that the adjusted marker positions 50 will be equal to the expected positions computed by 41. The camera position calculation process 45 will thus compute values for position and orientation that are identical to those computed by 40 and will therefore correspond to those derived directly from the observed marker positions.

If a marker disappears, the camera position and orientation 47 computed from the raw marker data may change slightly. This will produce a change in the expected marker positions computed by 41. However, this change will not immediately appear at the output of the filter 43, due to its temporal low-pass nature. The adjusted marker positions 50 will therefore be essentially unchanged from the adjusted positions corresponding to the situation before the marker disappeared, although there will be one fewer marker positions present. (Note that the subtracter 42 and the adder 44 only produce a valid output for markers which are present at both of their inputs.) The camera position that is computed by process 45 will therefore be essentially unchanged from that which would have been computed had a marker not disappeared. This is because the marker positions 50 are all self-consistent; that is, any combination of markers will produce the same computed camera position and orientation.

As time passes (and assuming no more markers appear or disappear), the output of filter 43 will gradually tend towards its input value. The adjusted marker positions will thus move slowly towards the positions computed by the process 41. Therefore, the final computed camera position 48 will slowly tend towards those at 47, computed from the raw marker data.

If a new marker appears in the image, the filter 43 must be initialised to allow that marker to be filtered. That is, values for the previous adjustment amount for the new marker must be assumed, since these are required for the temporal filter to operate. The simplest option would be to assume a previous adjustment amount of zero, but that would be likely to result in a jump in the computed camera position, since the adjustment amount is unlikely to be exactly zero. A preferable option is to derive a value which will ensure that there is no sudden jump in the calculated camera position. A way in which this may be carried out is as follows. When the marker first appears in the image, its presence is ignored by the camera position and orientation computation processes and the temporal filter, which operate only on the markers visible in both the current and preceding image. The expected position of the new marker, based on the computed camera position and orientation, is then computed by process 46. The difference between this expected position and the position at which it actually appeared is computed by subtracter 51 and used to initialise the filter 43. This initialises the filter to the state it would have been in had the new marker always had this difference between expected and observed position. On the next frame, the new marker is used by all the processing stages. Its appearance is likely to result in a change of the camera position and orientation 47 computed from the raw marker data, but this change will not immediately affect the output of the temporal filter 43. The process 45 will therefore produce a result very similar to that which it would have produced had the new marker not appeared. Gradually, however, the correction displacements at the output of the filter 43 will tend towards those corresponding to the camera position computed by 40, and the camera position computed by 45 will therefore tend to that computed by 40.

If fewer than three markers are seen in any image, the system will be unable to compute a position or angle, since the number of unknowns (three angles and three position coordinates) outnumber the number of observed values (two image coordinates for three markers). The system may also fail to compute a valid result in some other circumstances, for example if a marker is misidentified or its measured position is grossly in error. When this happens, it is advantageous to continue to output the last valid measurement until a valid result is obtained. Furthermore, it may be advantageous to initialise the filter 43 to the state it would be in if all markers had zero positional differences. This allows the system to quickly recover from a situation in which it has made some inaccurate measurements.

A variant in which markers are positioned in the field of view of the camera will now be described; this may be used to supplement the positional information obtained from the above method, or may be used to obtain positional information independently. This variant employs an optical system based on cluster of markers placed in the scene. Each cluster preferably contains at least three individual markers (for example encoded concentric rings), preferably at differing heights above a reference surface, and more preferably contains at least six individual markers. The clusters are preferably formed as rigid units on which the individual markers are fixed; this enables the relative locations of each marker within each cluster to be known to a high degree of accuracy.

Figure 7:
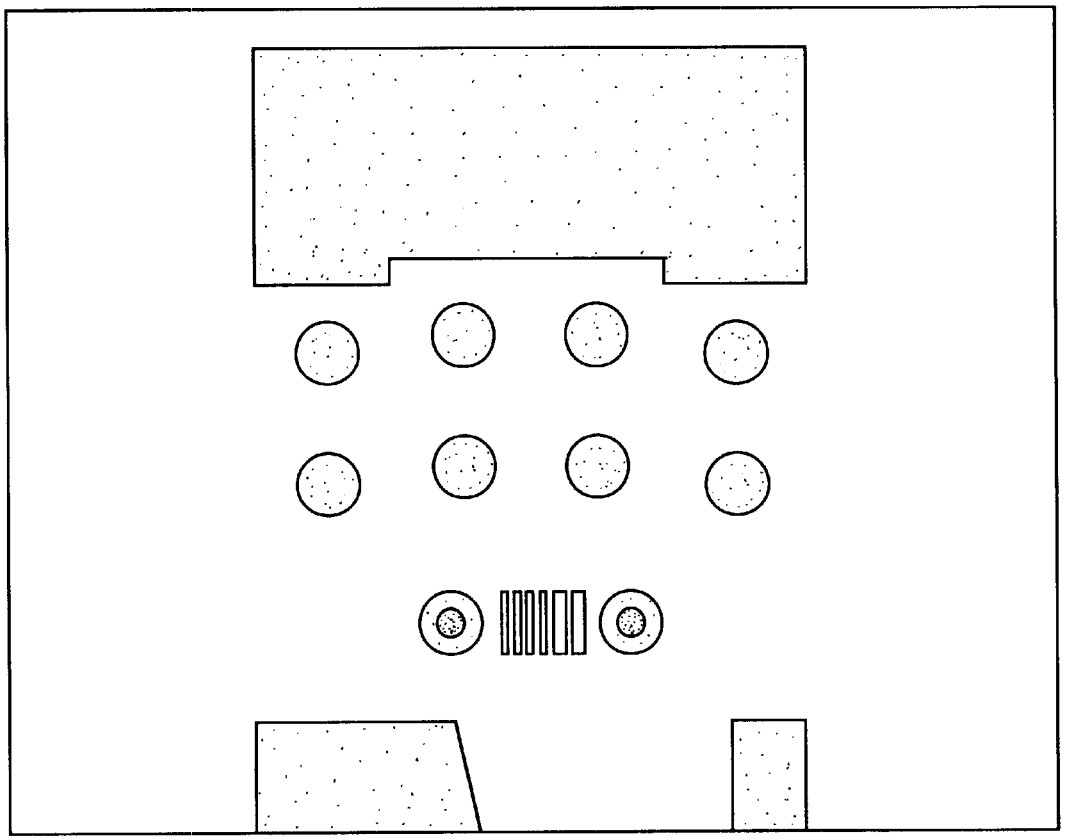
FIG. 7 depicts a marker suitable for placing in the field of view of a video camera.

In a preferred implementation, as depicted in FIG. 7, each cluster of markers consists of six circles in one shade of blue against a background in a slightly different shade, in order to allow them to be keyed out. The use of two-tone blue for camera position measurement has already been used effectively. The cluster is designed so that the circles are not all co-planar; this allows the camera position to be computed unambiguously from a single cluster, and also facilitates the automatic measurement of the cluster positions. Each marker within the cluster has a barcode to identify it uniquely.

The image is analyzed to locate the exact position of each marker within each cluster, from which the camera position and orientation (three position coordinates and three rotation angles) can be computed, given the known positions of the markers in the studio. The internal camera parameters (including focal length and pixel size) need to be known. Where the camera has a zoom lens, these can be determined by sensors on the lens and/or by known methods of detecting zoom and focus settings of a lens from the image. If a fixed lens is used, the settings can be determined by a separate initial calibration procedure, since they remain fixed for a given choice of lens.

The clusters need not all contain the same number of individual markers, and individual markers may also be disposed at known positions within the image.

The only constraint this system places on the positioning of marker clusters is that at least one, and ideally a minimum of around three, need to be visible at all times. As many clusters as needed to cover the area of the action can be used, placed so as not to interfere with the movement of actors. This approach is inherently extendable to very large studios, and allows for scenes involving significant actor and camera movement, such as following actors running down long corridors.

Since the clusters can be re-positioned to suit each scene being shot, it is important to include a method to automatically measure their positions to a high accuracy. This may be achieved by capturing a number of images, each showing two or more clusters. The identities of the markers in each image can be determined automatically. A global least squares adjustment determines the relative position and orientation of all markers across the various images.

The system is preferably designed to run in real-time using a standard workstation equipped with a frame grabber. To achieve this, it desirable to track the position of markers from one frame to the next, so that only a small fraction of the image (around the predicted marker positions) needs to be searched. Furthermore, this may allow the use of a simple algorithm to find the centre of each circle. Using such an approach, it has been found possible to measure the camera position at a rate of 25Hz (when tracking 20 circles) using a PC based on a 200MHz Pentium Pro. When the system is started, however, the entire image does need to be searched, which takes several seconds.

Although the techniques described are ideally suited to video camera position determination, they can be applied to, for example, determination of position of robot arms or to virtual reality, in which the position of a headset worn be a user is determined.

Claims:

1. A method of determining the three-dimensional position of an object in a reference frame, the method comprising:

providing three or more markers at respective reference positions, at least three of the markers being patterned as a series of concentric shapes encoding a plurality of bits of identification information in the darkness or color of the shapes, the center of the concentric shapes of each patterned marker providing a reference point for each marker, wherein each marker has a respective distance from a reference plane of the reference frame, the distances varying between the markers;

storing information including a measure of the three-dimensional positions of the markers in the reference frame and information identifying the patterned markers;

obtaining an image of at least a sub-set of said markers from a camera associated with the object;

processing the image to identify the positions of said markers in the image and, for each patterned marker in the sub-set, identifying the respective reference point and decoding said identification information;

determining a measure of the three-dimensional position of the object in the reference frame based on said processing and decoding and based on said stored information.

2. A method according to claim 1, wherein the patterned markers encode a plurality of bits of information in binary form as a series of light and dark shapes.

3. A method of determining the three-dimensional position of an object in a reference frame, the method comprising:

providing three or more markers at respective reference positions, at least three of the markers being patterned to encode a plurality of bits of identification information in binary form in a series of concentric light and dark regions, the center of the concentric regions providing a reference point, wherein each marker has a respective distance from a reference plane of the reference frame, the distances varying between the markers;;

storing information including a measure of the three-dimensional positions of the markers in the reference frame and information identifying the patterned markers;

obtaining an image of at least a sub-set of said plurality of markers from a camera associated with the object;

processing the image to identify the positions of said markers in the image and, for each patterned marker in the sub-set, decoding said identification information and identifying the reference point; and determining a measure of the three-dimensional position of the object in the reference frame based on said processing and decoding and based on said stored information.

4. A method of producing a set of at least three markers for use in determining the three-dimensional position of an object in a reference frame in a method according to claim 3, the markers having a mutually different identifiers encoded as a plurality of bits of information, the method comprising:

providing mutually different identifiers to be encoded in binary form; and providing on a mountable backing a series of concentric shapes, each shape having either a high or a low brightness or reflectivity, the thickness or brightness or reflectivity of each ring shape selected according to a pre-determined coding scheme to encode the information, wherein the center of the shapes provides a reference point.

5. A method according to claim 2, wherein the shapes are circular rings.

6. A method according to claim 2, wherein 3 or more bits of identification information are encoded.

7. A method according to claim 2, wherein 4 or more shapes are provided.

8. A method according to claim 2, wherein each bit of the information is assigned to a corresponding shape.

9. A method according to claim 2, wherein at least one outer region of a predetermined brightness is provided.

10. A method according to claim 2, wherein at least one parity or other error-correcting bit is included in the encoded information.

11. A method according to claim 2, wherein dark shapes are substantially black.

12. A method according to claim 2, wherein light shapes are retro-reflective so as to reflect light directed from adjacent said camera substantially towards said camera.

13. A method according to claim 12, further including illuminating the markers with a light source substantially coincident with the axis of said camera means so that light falling on said light shapes is retro-reflected towards said camera.

14. A method according to claim 1, wherein each shape is coloured, patterned or shaded to encode a plurality of bits of identification information.

15. A method according to claim 1, wherein all markers are patterned to encode identification information.

16. A method according to claim 1, wherein at least some markers encode identification information uniquely identifying that marker among the plurality of markers.

17. A method according to claim 1, wherein the markers are so disposed that the position of the object can be uniquely determined at all points within a given volume of the reference frame.

18. A method according to claim 1 including adjusting the determined position to smooth out sudden changes in determined position as markers are revealed or obscured.

19. A method according to claim 18, wherein adjusting comprises storing pre-stored or measured marker positions as initial marker positions;

dynamically applying correction factors to said initial marker positions to produce respective corrected marker positions;

determining the object position based on the corrected marker positions, wherein said dynamically applying correction factors comprises calculating correction factors so that the corrected marker positions are corrected to become mutually self-consistent values, the rate of variation of the correction factors being limited to a pre-determined level by limiting the rate of change of correction factors.

20. A method of determining the position of an object based on identification of a plurality of markers at respective reference positions, the method comprising:

storing pre-stored or measured marker positions as initial marker positions;

dynamically applying correction factors to said initial marker positions to produce respective corrected marker positions;

determining the object position based on the corrected marker positions, wherein said dynamically applying correction factors comprises calculating correction factors so that the corrected marker positions are corrected to become mutually self-consistent values, a rate of variation of the correction factors being limited to a pre-determined level by limiting the rate of change of correction factors.

21. A method according to claim 20, wherein the predetermined level is selected so that transitions in the determined image position resulting from one or more identified markers becoming unusable or new markers becoming usable are smoothed over a period of at least about 2 seconds.

22. A method according to claim 20, wherein a measure of the accuracy of position determination is obtained.

23. A method according to claim 22, wherein said measure is based on determination of said correction factors.

24. A method according to claim 1, wherein said object is a video camera having a field of view differing from the field of view of said camera.

25. A method according to claim 24 further comprising providing at least one supplementary marker at a given position so as to be viewable by the video camera, the or each marker having identification information encoded thereon in binary form as a series of concentric rings of two tones, the tones being selected to enable the marker to be keyed out of the video camera image by chroma-keying, said determining the position of the video camera being based on the position of the supplementary marker, if present, in the video camera image.

26. Apparatus for determination of the three-dimensional position of an object in a reference frame, the apparatus comprising:

a camera for mounting on an object whose position is to be determined;

a memory arranged to store measures of the three-dimensional positions of at least three markers in the reference frame and to store information identifying patterned encoded markers which markers comprise a series of concentric shapes encoding identification information as the darkness or color of the shapes, the center of the concentric shapes of each patterned marker providing a reference point for each marker;

image processing means arranged to process an image output by the camera to identify the positions of markers in the image, to decode information encoded in the patterned markers and to determine the position of said reference points; and position determining means arranged to determine the three-dimensional position of the object in the reference frame based on the output of the image processing means and the information stored in the memory means.

27. Apparatus according to claim 26 wherein the memory, image processing means and position determining means are integrated into a single computer.

28. Apparatus according to claim 26 further including a set of at least three markers, including a subset of at least three patterned markers having identification information encoded as a series of concentric rings of light and dark regions, the center of the rings providing a reference point.

29. Apparatus according to claim 26 for use with markers including retro-reflective portions so as to reflect light directed from adjacent said camera substantially towards said camera, the apparatus having light-projection means substantially optically coincident with the axis of said camera.

30. Apparatus according to claim 29 wherein the light-projection means is pulsed, arranged to be pulsed on at a time when said camera means is integrating.

31. Apparatus according to claim 29 wherein the camera means is provided with filter means having a transmission window selected to pass light transmitted by the light-projection means but to inhibit at least some other light.

32. Apparatus according to claim 31, wherein the light-projection means comprises n infra-red LED and said filter inhibits visible light but passes infra-red.

33. Apparatus according to claim 26 including means for applying correction factors to stored or measured marker positions to produce respective corrected marker positions and determining the object position based on the corrected marker positions, the means for applying correction factors comprising:

further memory for storing pre-stored or measured marker positions as initial marker positions;

means for dynamically applying correction factors to said initial marker positions to produce respective corrected marker positions;

means for determining the object position based on the corrected marker positions, wherein said means for dynamically applying correction factors comprises means for calculating correction factors so that the corrected marker positions are corrected to become mutually self-consistent values, the rate of variation of the correction factors being limited to a pre-determined level by limiting the rate of change of correction factors.

34. Apparatus according to claim 26 arranged to determine the position of a video camera wherein said camera comprises a further camera mounted on the video camera, said camera facing in a different direction to the video camera.

35. Apparatus according to claim 34, including means for detecting the zoom and/or focus settings of the video camera.

36. A set of at least three patterned markers mountable in a reference frame to enable the three-dimensional position of an object with respect to the reference frame to be determined in accordance with the method of claim 1, each marker comprising a series of concentric rings, each marker encoding an identifier of the marker as a plurality of bits of information in binary form as the brightness or reflectivity and/or thickness of each ring, the identifier of the markers varying between the markers, the center of the rings providing a reference point for the markers.

37. Marker apparatus for positioning in the field of view of a video camera for use in determining the relative position of the camera and the marker apparatus, the apparatus comprising:

a base;

a first patterned marker mounted at a first predetermined relative positions on a substantially rigid base, the first patterned marker having identification information encoded thereon in binary form as a series of concentric rings of two tones, the tones being selected to enable the marker to be keyed out of the video camera image by chroma-keying, the center of the rings providing a reference point for the marker, the first marker being at a first height from the base;

a second patterned marker mounted at a second predetermined relative positions on a substantially rigid base, the second patterned marker having identification information encoded thereon in binary form as a series of concentric rings of two tones, the tones being selected to enable the marker to be keyed out of the video camera image by chroma-keying, the center of the rings providing a reference point for the marker, the second marker being at a second height from the base;

a third patterned marker mounted at a third predetermined relative positions on a substantially rigid base, the third patterned marker having identification information encoded thereon in binary form as a series of concentric rings of two tones, the tones being selected to enable the marker to be keyed out of the video camera image by chroma-keying, the center of the rings providing a reference point for the marker, the third marker being at a third height from the base; wherein said first height, said second height and said third height are all mutually different, whereby a three dimensional position fix relative to the base can be obtained from the markers.

38. A method of determining the relative three-dimensional positions of at least one camera and an object having at least three markers mounted thereon, the relative positions of the markers and the object being substantially fixed, each marker being patterned to encode identification information in binary form as the darkness or color of a series of concentric rings, the center of the rings providing a reference point, the method comprising:

storing the relative three dimensional positions of the markers with respect to the object and information enabling the identification information to be decoded;

receiving an image from the camera;

identifying the positions of the markers in the camera image;

decoding the identification information encoded on each marker;

determining the position of the reference point for each marker; and based on the stored information, determining a measure of the relative three-dimensional positions and orientations of said at least one camera and object.

39. A method according to claim 3, wherein the reference frame comprises a production studio having at least 10 markers positioned on the ceiling thereof, wherein the camera is an upward-pointing camera mounted on a studio camera.

40. A virtual production studio having at least three patterned markers mounted on the ceiling thereof at mutually different distances from the ceiling to enable the three-dimensional position of an object with respect to the studio reference frame to be determined in accordance with the method of claim 1, each marker comprising a series of concentric rings, each marker encoding an identifier of the marker as a plurality of bits of information in binary form as the brightness or reflectivity and/or thickness of each ring, the identifier of the markers varying between the markers, the center of the rings providing a reference point for the markers.

41. A virtual production studio according to claim 40, having at least 10 markers mounted on the ceiling thereof.

42. A virtual production studio according to claim 40 including a store of the three-dimensional positions and identifiers of the markers for use in position determination.

43. A virtual production studio according to claim 40 including at least one studio camera arranged to capture a subject in a working space of the studio, the studio camera having apparatus for determination of the three-dimensional position of the studio camera in the studio reference frame, the apparatus for determination of the three-dimensional position comprising:

a camera for mounting on the studio camera and arranged to point upwards at the markers when the studio camera is upright and pointed at a subject in said working space;

a memory storing measures of the three-dimensional positions of said markers in the reference frame and to store information identifying patterned encoded markers which markers comprise a series of concentric shapes encoding identification information as the darkness or color of shapes, the center of the concentric shapes of each patterned marker providing a reference point for each marker;

image processing means arranged to process an image output by the camera to identify the positions of markers in the image, to decode information encoded in the patterned markers and to determine the position of said reference points; and position determining means arranged to determine the three-dimensional position of the studio camera in the studio reference frame based on the output of the image processing means and the information stored in the memory means.

44. A method of providing a virtual production, the method comprising determining the position of a video camera in accordance with claim 24; and applying a video effect to the output of the video camera based on the determined position.

* * * * *